W. A. Blundell,
Harness.

No. 112,889.  Patented Mar. 21, 1871.

Witnesses:
Jno. W. Harthet,
Robert Burns.

Inventor:
William A. Blundell
by his Attys
Harthet & Co

UNITED STATES PATENT OFFICE.

WILLIAM A. BLUNDELL, OF ST. LOUIS, MISSOURI, ASSIGNOR TO HIMSELF, WILLIAM P. NELSON, AND MATHEW C. TULLY.

IMPROVEMENT IN ATTACHMENTS FOR HARNESS.

Specification forming part of Letters Patent No. 112,889, dated March 21, 1871.

*To all whom it may concern:*

Be it known that I, WILLIAM A. BLUNDELL, of St. Louis, in the county of St. Louis and State of Missouri, have made certain new and useful Improvements in Single or Double Horse Attachments; and I do hereby declare that the following is a full and true description thereof, reference being had to the accompanying drawings, and to the letters of reference marked thereon.

This invention has for its object the construction of a suitable harness and tug attachment adapted for use chiefly in drawing small cars, rock-trucks, car-wheels, &c.; and the nature thereof consists in forming the tugs inflexible and the manner of attaching and securing said tugs to the whiffletree and collar-hames, so as to be readily detachable, as required.

Figure 1:
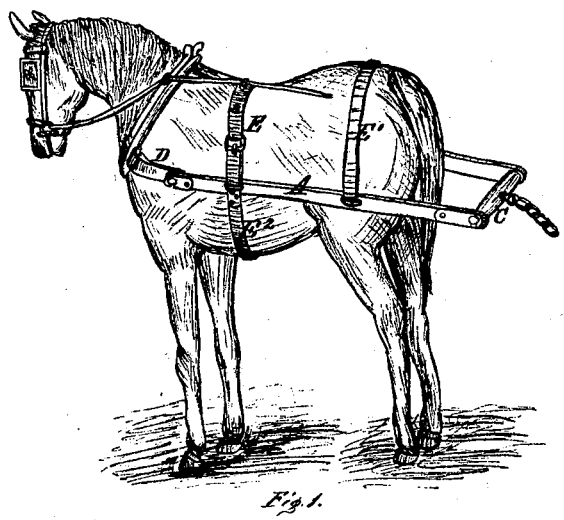
Figure 2:
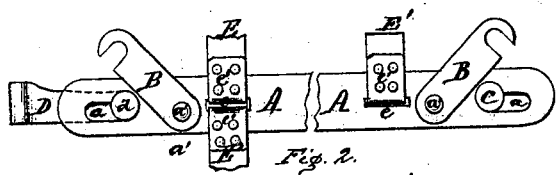
Figure 3:
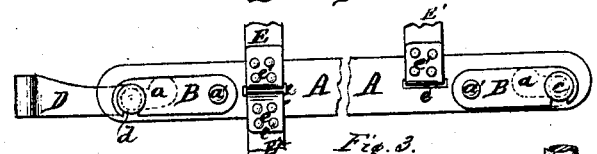
Figure 4:
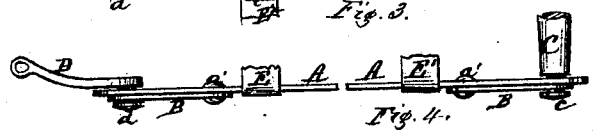

To enable those herein skilled to make and use my said invention, I will now more fully describe the same, referring to the accompanying Figure 1 as a perspective view; to Figs. 2 and 3 as part side elevations, respectively, showing trace-hooks detached and secured, and to Fig. 4 as a part top plan.

By preference, the shafts or tugs A are formed of suitable metal. At the ends, said tugs A have elongated slots $a$ and hooks B pivoted at $a'$, and constructed as generally indicated in detail, Figs. 2 and 3. The tugs A are attached to the whiffletree C, having suitable knob-hooks, $c$, fitted to pass in the slots $a$ of the tug A. The hook B, being then inserted over the knobs $c$, secures said tugs to the whiffletree, as required. The front ends of the tugs A, by a similar hook, B, are secured to a trace or hame-clip, D, (having a knob, $d$, to fit in the slots $a$,) to the collar-hames or hame-hooks in manner usual. By thus attaching the tugs A to the collar-hames and whiffletrees, respectively, it is plain said tugs are readily detachable. At the same time the attachment is such that accidental disengagements of the tugs are prevented. The ends of the tugs are also strengthened where most needed. The tugs A are supported at the sides of the animal by the straps E E' passing over the back of the animal, and secured in slots $e$ by suitable metallic end loops, $e'$, as shown in Figs. 2 and 3. A back-strap and crupper connect the straps E E' on the horse's back in manner usual; also, securely connected to the tugs A is the strap $E^2$, serving as the usual belly-band. The animal, thus harnessed, is readily detachable from its draft-load without any liability to accident, and the delays and inconveniences incident to the ordinary mode of disengaging the animal from its load are overcome. Furthermore, by constructing the tugs A inflexible, the same are always retained in an inclined horizontal position, leaving sufficient space for the free movements of the animal, and rendering the draft for the animal more easy and comfortable.

I do not claim forming the tugs A inflexible or securing the saddle and belly-straps to inflexible tugs; but What I do claim is—

The straps E E' $E^2$ and inflexible tugs A, having slots $a$ and hooks B at each end, relatively arranged to form a harness attachment, as described, and operating in the manner specified.

In testimony of said invention I have hereunto set my hand.

W. A. BLUNDELL.

Witnesses:
WILLIAM W. HERTHEL,
ROBERT BURNS.